(12) United States Patent
Toda

(10) Patent No.: US 8,264,734 B2
(45) Date of Patent: Sep. 11, 2012

(54) PRINT MANAGEMENT APPARATUS, PRINT MANAGEMENT SYSTEM, MEDIUM FOR STORING PRINT MANAGEMENT PROGRAM AND PRINT MANAGEMENT METHOD

(75) Inventor: Takanori Toda, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 886 days.

(21) Appl. No.: 12/359,760

(22) Filed: Jan. 26, 2009

(65) Prior Publication Data

US 2009/0195834 A1 Aug. 6, 2009

(30) Foreign Application Priority Data

Feb. 1, 2008 (JP) ................... 2008-023047

(51) Int. Cl.
*G06K 15/00* (2006.01)
(52) U.S. Cl. ............. 358/1.18; 358/1.13; 358/1.15; 715/204; 715/255; 715/243; 715/788; 709/202; 709/203
(58) Field of Classification Search .......... 358/1.13, 358/1.15, 1.18; 715/255, 204, 243, 788; 709/202, 203
See application file for complete search history.

(56) References Cited

U.S. PATENT DOCUMENTS

| 7,471,401 | B2 * | 12/2008 | Saito | 358/1.13 |
| 2004/0105128 | A1 * | 6/2004 | Sano | 358/1.18 |
| 2004/0190057 | A1 * | 9/2004 | Takahashi et al. | 358/1.15 |
| 2005/0289460 | A1 * | 12/2005 | Tomita et al. | 715/530 |

FOREIGN PATENT DOCUMENTS

| JP | 07-264385 A | | 10/1995 |
| JP | 2000-227849 A | | 8/2000 |
| JP | 2000227849 A | * | 8/2000 |
| JP | 2001-313811 A | | 11/2001 |
| JP | 2001313811 A | * | 11/2001 |
| JP | 2007-272782 A | | 10/2007 |

OTHER PUBLICATIONS

Notification of Reasons for Refusal, dated Oct. 4, 2011, issued in corresponding JP Application No. 2008-023047, 5 pages in English and Japanese.

* cited by examiner

*Primary Examiner* — Jacky X Zheng
(74) *Attorney, Agent, or Firm* — Sughrue Mion, PLLC

(57) ABSTRACT

A print image acquiring section acquires print images to be aligned and printed on a print medium. An arrangement storing section stores prescribed arrangements preset under a predetermined prescription and a free arrangement to be added. An arrangement data preparing section prepares a free arrangement and stores the free arrangement in the arrangement storing section. An arrangement searching section finds an arrangement where the same number of pages as a designated number are aligned, through the arrangements stored in the arrangement storing section. An arrangement designation receiving section receives designation of an arrangement for printing, of the arrangements found by the arrangement searching section. A print data preparing section prepares, according to the print image acquired by the print image acquiring section and the arrangement designated by the arrangement designation receiving section, print data representing a print image to be printed on a print medium and an arrangement of the print image.

4 Claims, 9 Drawing Sheets

PRINT MANAGEMENT APPARATUS, PRINT MANAGEMENT SYSTEM, MEDIUM FOR STORING PRINT MANAGEMENT PROGRAM AND PRINT MANAGEMENT METHOD

BACKGROUND OF THE INVENTION

1. Field of the Invention

The present invention relates to a print management apparatus which manages the arrangement of print images to be printed on a print medium, a print management system, a medium for storing a print management program, and a print management method.

2. Description of the Background Art

In binding magazines and the like, conventionally, the following technique has been used. A so-called imposition is carried out, that is to say, the respective pages of a magazine are allocated to the front and rear surfaces of a large sheet of paper having an area for a number of pages so that the print data representing print images of these pages is prepared by specifying the arrangement on this large sheet of paper. The respective press plates of C (cyan), M (magenta), Y (yellow) and K (black) are fabricated on the basis of the print data, these press plates are attached to a printing and binding machine so that printing is carried out, and the printed sheets of paper are folded in an aspect according to the imposition, and then the ends are cut so that the magazines are complete, and thus various proposals have been made to simplify this imposition (see, for example, Japanese Laid-Open Patent Publication No. 2007-272782).

Recently, several types among various imposition patterns have been standardized, and printing and binding systems following this standard make automatic binding possible only by selecting a desired pattern from among the standardized imposition patterns and reading in print images into the system.

In addition, some of these printing and binding systems have a search function for narrowing down and searching imposition patterns registered in the system for an imposition pattern that satisfies predetermined conditions by inputting the conditions, for example, the number of pages to be allocated on one sheet of print paper.

In these printing and binding systems, however, it is necessary to register imposition patterns outside the standards in the system after describing the pattern from the beginning using a page describing language, such as XML or Postscript, in accordance with the JDF (Job Definition Format) prescribed under CIP 4 (International Standardizing Group for Printing) or a format unique to the printing and binding system, or after preparing the pattern outside the system by reediting the descriptions on the pages in the imposition pattern outside the current standards, and a problem arises in that this operation is troublesome.

In addition, in the case where the total number of pages in a magazine is 32 and the standards are narrowed down when the number of pages to be allocated on one side of one sheet of print paper is inputted as 16 in such a printing and binding system, for example, the results of narrowing down the patterns include an allocation pattern where the number of pages on one side is 8 and the pages are allocated in two sheets, and an allocation pattern where the number of pages on one side is 4 and the pages are allocated in four sheets, and a problem arises in that this operation is troublesome.

SUMMARY OF THE INVENTION

The present invention has been made in view of the circumstances and provides a print management apparatus, a print management system, a medium for storing a print management program, and a print management method, by all which arrangement of print images on a print medium is simplified.

A print management apparatus of the present invention includes:

a page acquiring section which acquires page data to represent respective print images for pages to be aligned and printed on a print medium;

an arrangement storing section which stores pieces of arrangement data to respectively represent prescribed arrangements preset under a predetermined prescription as arrangements for aligning pages on a print medium, and also stores a piece of arrangement data to represent a free arrangement which are not defined under the prescription and to be added after the prescribed arrangements;

an arrangement data preparing section which prepares a piece of arrangement data to represent a free arrangement when the free arrangement is designated, and stores the piece of arrangement data in the arrangement storing section;

an arrangement search section which carries out a search to find, when a number of pages to be aligned on a print medium is designated, pieces of arrangement data that each represent an arrangement where pages whose quantity is the same as the designated number are aligned, through the pieces of arrangement data stored in the arrangement storing section, irrelevant of whether each of the pieces of arrangement data to be found represents the prescribed arrangement or the free arrangement;

an arrangement designation receiving section which receives designation of an arrangement to be used for a printing, among the arrangements represented by the pieces of arrangement data found through the search carried out by the arrangement search section; and a print data preparing section which prepares, for a print system that receives input of a piece of print data representing print images to be printed on each page of a print medium and also representing an arrangement of the print images on the print medium and outputs the print images for each page on the print medium in accordance with the arrangement, a piece of print data to be used in the print system, in accordance with the print images represented by the page data acquired by the page acquiring section and the arrangement of the designation received by the arrangement designation receiving section.

According to the print management apparatus of the present invention, the time and effort for preparing the arrangement data representing a free arrangement outside the apparatus can be saved, and the arrangement data representing a desired arrangement can be searched for appropriately. Accordingly, according to the print management apparatus of the present invention, print images can be arranged simply on a print medium.

It is preferable that the arrangement data preparing section prepares a piece of arrangement data that represents a free arrangement, the free arrangement being established when a modification of an arrangement represented by a piece of arrangement data stored in the arrangement storing section is designated and the modification is adopted.

As described above, if a free arrangement is prepared, the arrangement already registered in the arrangement storing section can be used, time and effort can be saved in comparison with a case where this is prepared from the beginning.

A print management system of the present invention includes:

a print management server which includes: a page acquiring section which acquires page data to represent respective print images for pages to be aligned and printed on a print medium, an arrangement storing section which stores pieces of arrangement data to respectively represent prescribed arrangements preset under a predetermined prescription as arrangements for aligning pages on a print medium, and also stores apiece of arrangement data to represent a free arrangement which is not defined under the prescription and to be added after the prescribed arrangements, an arrangement data preparing section which prepares a piece of arrangement data to represent a free arrangement when the free arrangement is designated, and stores the piece of arrangement data in the arrangement storing section, an arrangement search section which carries out a search to find, when a number of pages to be aligned on a print medium is designated, pieces of arrangement data that each represent an arrangement where pages whose quantity is the same as the designated number are aligned, through the pieces of arrangement data stored in the arrangement storing section, irrelevant of whether each of the pieces of arrangement data to be found represents the prescribed arrangement or the free arrangement, an arrangement designation receiving section which receives designation of an arrangement to be used for a printing, among the arrangements represented by the pieces of arrangement data found through the search carried out by the arrangement search section, and a print data preparing section which prepares, for a print system that receives input of a piece of print data representing print images to be printed on each page of a print medium and also representing an arrangement of the print images on the print medium and outputs the print images for each page on the print medium in accordance with the arrangement, a piece of print data to be used in the print system, in accordance with the print images represented by the page data acquired by the page acquiring section and the arrangement of the designation received by the arrangement designation receiving section; and a client which includes:

a page outputting section which outputs page data to the page acquiring section, a free arrangement designating section which accepts a preparation operation for preparing a free arrangement, and designates, for the arrangement data preparing section, the free arrangement prepared in accordance with the preparation operation, a page number designating section into which a number of pages is inputted through an operation and which designates the number for the arrangement search section, an arrangement displaying section which displays arrangements represented by the respective pieces of arrangement data found through the search by the arrangement search section, and a selection arrangement designating section which accepts a selection operation to select an arrangement used to perform a printing from among the arrangements displayed by the arrangement displaying section and designates, for the arrangement designation receiving section, the arrangement selected through the selection operation.

In the print management system according to the present invention, a print management system, which allows print images to be arranged easily on a print medium, can be realized.

It is preferable that the free arrangement designating section receives a modification operation which modifies an arrangement represented by a piece of arrangement data stored in the arrangement storing section as the preparation operation, and designates, for the arrangement data preparing section, contents of the modification by the modifying operation, and the arrangement data preparing section adopts the modification of which the contents are designated by the free arrangement designating section to establish a free arrangement and prepares a piece of arrangement data to represent the established free arrangement.

It is also preferable that the arrangement displaying section displays an arrangement of pages on a print medium.

By doing this, the arrangement can be selected with high precision.

It is preferable that the prescribed arrangement defines how to fold a print medium under the prescription, and the arrangement displaying section displays the arrangement of pages on a print medium and how to fold the print medium.

By doing this, the arrangement can be selected with higher precision.

A computer-readable program storage medium of the present invention stores a print management program to be executed in a computer and implement in the computer:

a page acquiring section which acquires page data to represent respective print images for pages to be aligned and printed on a print medium;

an arrangement data preparing section which prepares a piece of arrangement data to represent a free arrangement when the free arrangement is designated, and stores the piece of arrangement data in an arrangement storing section, the arrangement storing section being a section which stores pieces of arrangement data to respectively represent prescribed arrangements preset under a predetermined prescription as arrangements for aligning pages on a print medium, and also stores a piece of arrangement data to represent a free arrangement which is not defined under the prescription and to be added after the prescribed arrangements;

an arrangement search section which carries out a search to find, when a number of pages to be aligned on a print medium is designated, pieces of arrangement data that each represent an arrangement where pages whose quantity is the same as the designated number are aligned, through the pieces of arrangement data stored in the arrangement storing section, irrelevant of whether each of the pieces of arrangement data to be found represents the prescribed arrangement or the free arrangement;

an arrangement designation receiving section which receives designation of an arrangement to be used for a printing, among the arrangements represented by the pieces of arrangement data found through the search carried out by the arrangement search section; and a print data preparing section which prepares, for a print system that receives input of a piece of print data representing print images to be printed on each page of a print medium and also representing an arrangement of the print images on the print medium and outputs the print images for each page on the print medium in accordance with the arrangement, a piece of print data to be used in the print system, in accordance with the print images represented by the page data acquired by the page acquiring section and the arrangement of the designation received by the arrangement designation receiving section.

The print management program according to the present invention can contribute to simplifying the arrangement of print images on a print medium.

Here, only the basic form of the print management program according to the present invention is illustrated simply to avoid complexity, and the print management program according to the present invention includes various types of forms corresponding to the print management apparatuses in addition to the basic form.

Furthermore, one element, such as an arrangement data preparing section formed in a computer by the print management program according to the present invention, may have one program part or plural program parts, or plural elements may have one program part. In addition, these elements may be formed so that these working effects may be provided by themselves, or may be formed so that these working effects can be provided through indications to other programs or program parts which are incorporated into the computer.

A print management method of the present invention is a method executed in a device, the method including:

a page acquiring step which acquires page data to represent respective print images for pages to be aligned and printed on a print medium;

an arrangement data preparing step which prepares a piece of arrangement data to represent a free arrangement when the free arrangement is designated, and stores the piece of arrangement data in an arrangement storing section, the arrangement storing section being a section which stores pieces of arrangement data to respectively represent prescribed arrangements preset under a predetermined prescription as arrangements for aligning pages on a print medium, and also stores a piece of arrangement data to represent a free arrangement which is not defined under the prescription and to be added after the prescribed arrangements;

an arrangement search step which carries out a search to find, when a number of pages to be aligned on a print medium is designated, pieces of arrangement data that each represent an arrangement where pages whose quantity is the same as the designated number are aligned, through the pieces of arrangement data stored in the arrangement storing section, irrelevant of whether each of the pieces of arrangement data to be found represents the prescribed arrangement or the free arrangement;

an arrangement designation receiving step which receives designation of an arrangement to be used for a printing, among the arrangements represented by the pieces of arrangement data found through the search carried out in the arrangement search step; and a print data preparing step which prepares, for a print system that receives input of a piece of print data representing print images to be printed on each page of a print medium and also representing an arrangement of the print images on the print medium and outputs the print images for each page on the print medium in accordance with the arrangement, a piece of print data to be used in the print system, in accordance with the print images represented by the page data acquired in the page acquiring step and the arrangement of the designation received in the arrangement designation receiving step.

The print management method according to the present invention can simplify the arrangement of print images on a print medium.

According to the present invention, there can be provided a print management apparatus, a print management system, a print management program, and a print management method, by all which arrangement of print images on a print medium is simplified.

BRIEF DESCRIPTION OF THE DRAWINGS

FIG. 9 is a diagram illustrating a state where an imposition pattern is selected from among displayed imposition patterns that have been searched for.

DESCRIPTION OF THE EMBODIMENTS

In the following, the embodiments of the present invention will be described.

Figure 1:
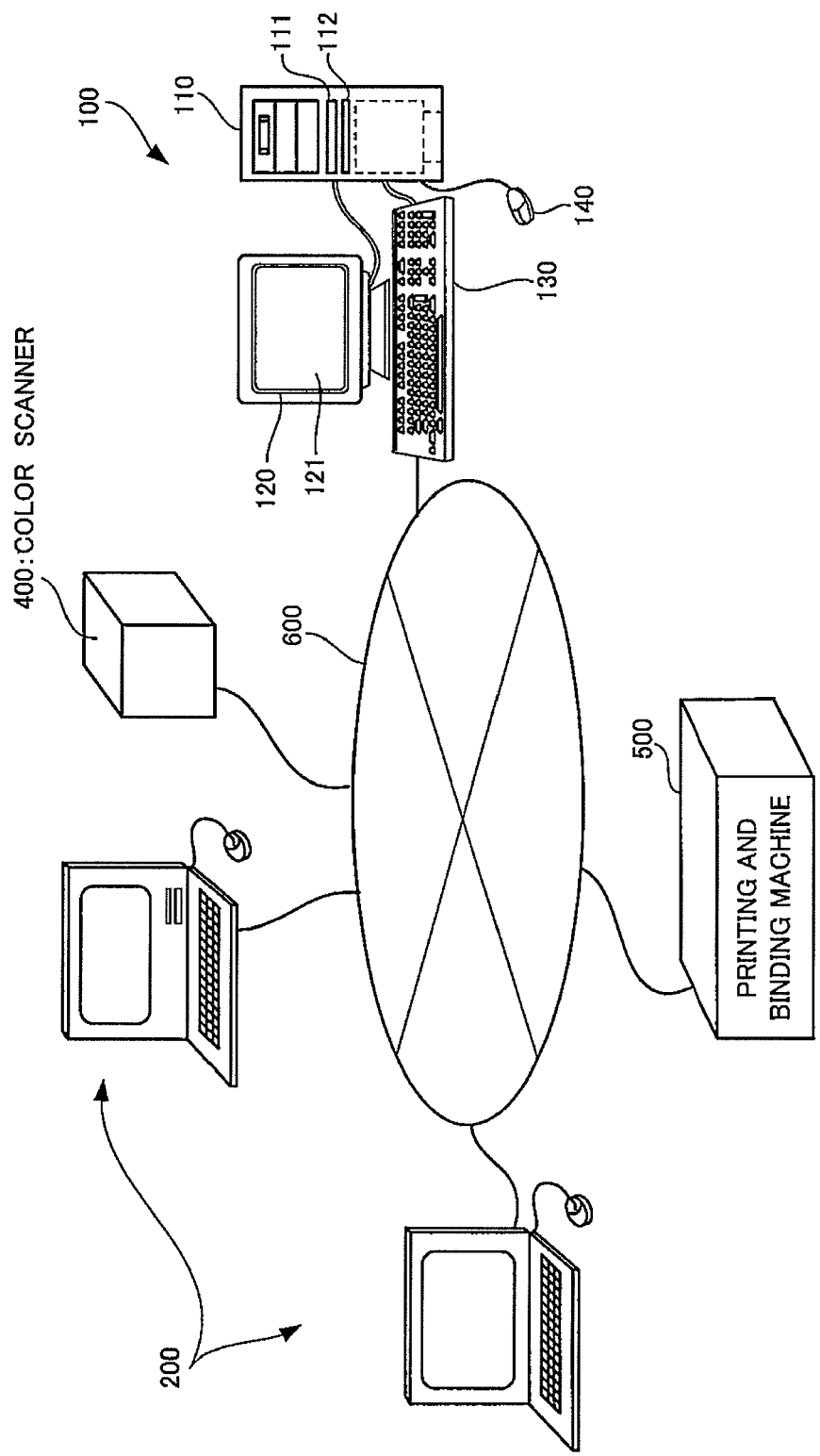
FIG. 1 is a diagram illustrating a print management system.

FIG. 1 is a diagram illustrating a print management system.

This print management system 10 has a server and client system, and FIG. 1 illustrates a computer forming a server apparatus 100 and computers forming client apparatuses 200.

In the client apparatus 200, a user prepares a new imposition pattern or selects an imposition pattern.

In the imposition patterns according to the present embodiment, the aspect of folding according to which a sheet of print paper on which print images of the respective pages are printed in a certain arrangement is folded and the aspect of cutting according to which the sheet of print paper in a folded aspect is cut are determined in addition to the arrangement in which plural pages are aligned on a predetermined sheet of print paper. Furthermore, this print management system 10 has a standard imposition pattern which is defined as a unified standard in the print industry and an imposition pattern in accordance with a local standard outside the norm.

In addition, FIG. 1 illustrates the state where a color scanner 400 for reading print images used for printing and a printing and binding machine 500 for printing and binding in accordance with the imposition are connected to this print management system 10 through a local area network 600.

This print management system 10 is one embodiment of the print management system according to the present invention, and the server apparatus 100 is one embodiment of the print management apparatus according to the present invention and corresponds to one example of the print management server according to the present invention, while the client apparatus 200 corresponds to one example of the client according to the present invention.

The operation of the print management system 10 illustrated in FIG. 1 is carried out in the computers that form the server apparatus 100 and the client apparatuses 200, and therefore these computers will be described first. Here, the computer forming the server apparatus 100 and the computers forming the client apparatuses 200 have different operations, but they share virtually the same structure in terms of hardware, and therefore the computer forming the server apparatus 100 will be described in the following as representing these computers.

As can be seen from the figure, the computer forming the server apparatus 100 is provided with a main body apparatus 110, a print image displaying apparatus 120 which displays print images on a display screen 121 in accordance with the instructions from the main body apparatus 110, a keyboard 130 with which various types of information are inputted into the main body apparatus 110 corresponding to the key operations, and a mouse 140 for inputting an indication, such as of an icon, displayed in a location on the display screen 121 which is designated by the mouse. As can be seen from the figure, this main body apparatus 110 has an FD loading opening 111 through which a flexible disk (hereinafter abbreviated as FD) is loaded and a CD loading opening 112 through which a CD medium represented by a CD-ROM is loaded.

Figure 2:
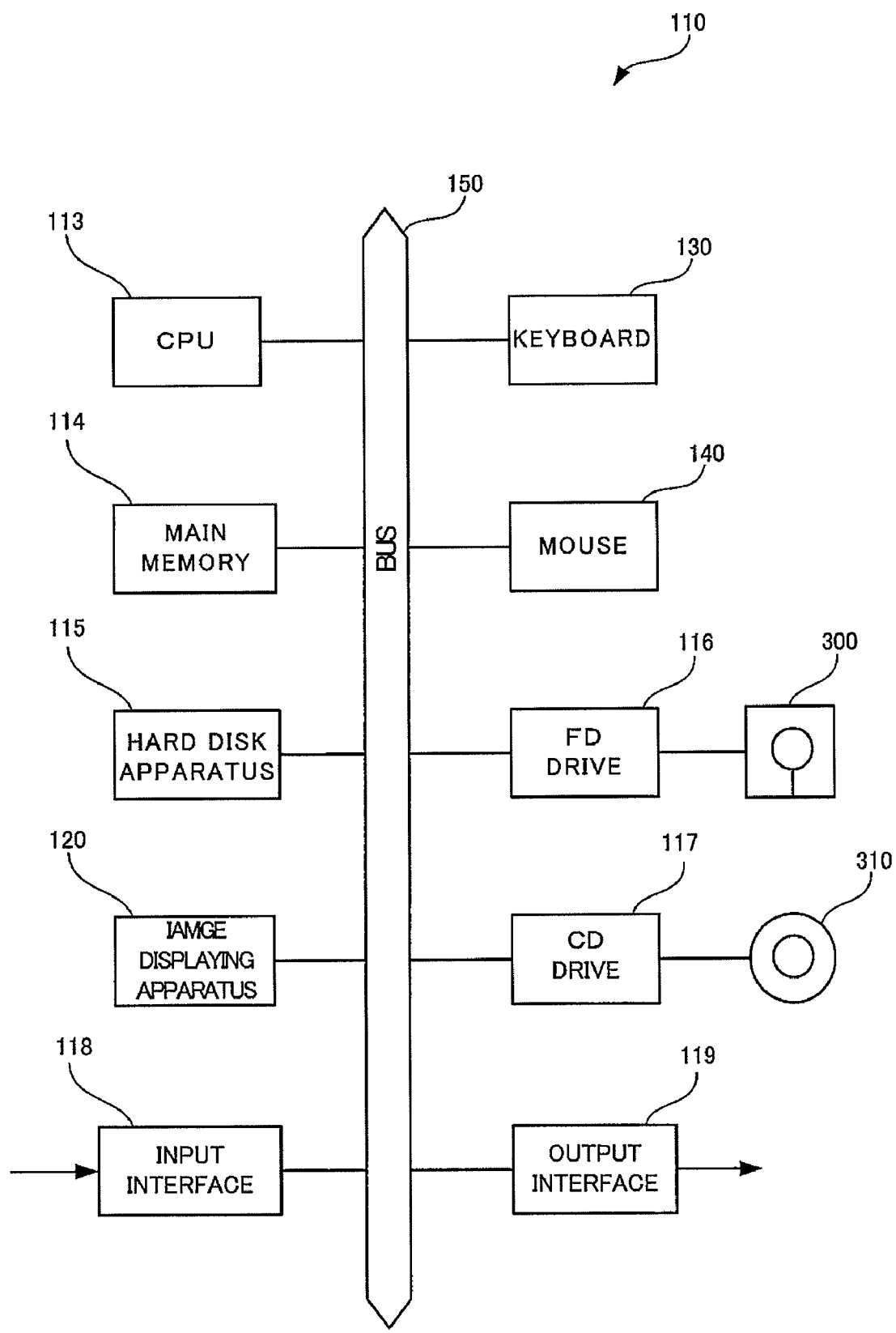
FIG. 2 is a diagram illustrating the structure of the hardware in the computer in FIG. 1.

FIG. 2 is a diagram illustrating the structure of the hardware of the computer illustrated in FIG. 1.

As illustrated in FIG. 2, a CPU 113 for running various types of programs, a hard disk apparatus 115 where various types of programs and data are stored, a main memory 114 used to read out a program stored in the hard disk apparatus 115 so that it is run in the CPU 113, an FD drive 116 for accessing an FD 300, a CD drive 117 in which a CD medium represented by a CD-ROM 310 is loaded and which accesses the loaded CD-ROM 310, an input interface 118 for inputting data from an external apparatus, and an output interface 119 for outputting data to an external apparatus are built into the main body apparatus 110.

A program for a server, which allows a computer to be operated as an example of the print management server according to the present invention, is stored in the CD-ROM 310. This CD-ROM 310 is loaded in the CD-ROM drive 117, and the program for a server stored in this CD-ROM 310 is uploaded into this computer and stored in the hard disk apparatus 115. In addition, the computer operates as an example of the print management server according to the present invention when this program for a server is started up and run.

Here a CD-ROM 320 where a program for a client is stored is loaded in computers forming the client apparatuses 200 instead of the CD-ROM 310 where a program for a server is stored. When the program for a client stored in this CD-ROM 320 is run, the computer operates as an example of the client in the present invention.

Next, a program for a server and a program for a client will be described.

Figure 3:
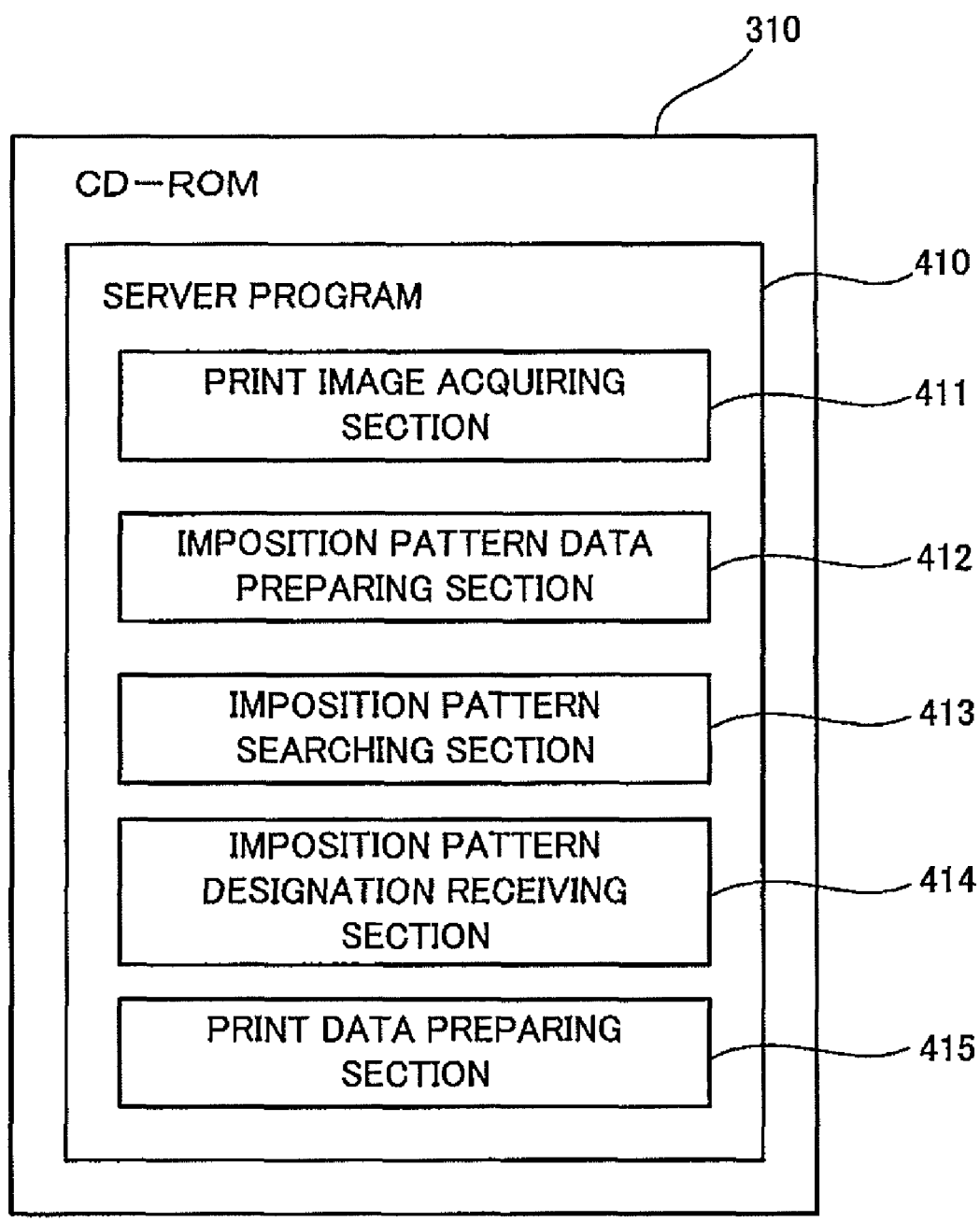
FIG. 3 is a schematic diagram illustrating a CD-ROM which stores a program for a server.
Figure 4:
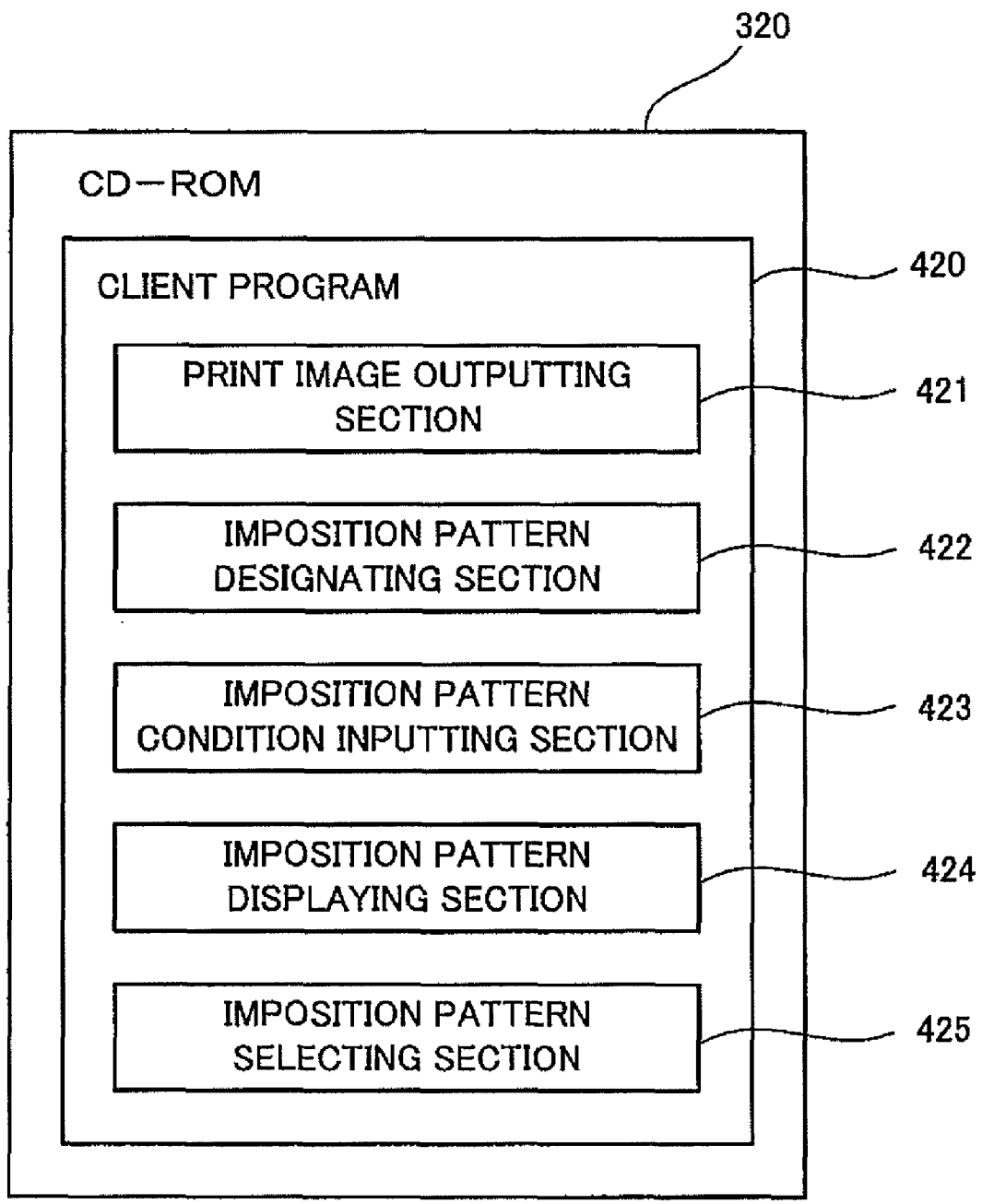
FIG. 4 is a schematic diagram illustrating a CD-ROM which stores a program for a client.

FIGS. 3 and 4 are schematic diagrams illustrating CD-ROMs where a program for a server and a program for a client are stored, respectively.

As illustrated in FIG. 3, the server program 410 stored in the CD-ROM 310 has a print image acquiring section 411, an imposition pattern data preparing section 412, an imposition pattern searching section 413, an imposition pattern designation receiving section 414 and a print data preparing section 415. This server program 410 is one embodiment of the print management program according to the present invention.

In addition, as illustrated in FIG. 4, the client program 420 stored in the CD-ROM 320 has a print image outputting section 421, an imposition pattern designating section 422, an imposition pattern condition inputting section 423, an imposition pattern displaying section 424 and an imposition pattern selecting section 425.

Respective sections in the server program 410 and the client program 420 will be described in detail in the following together with the working effects of the respective sections of the server apparatus 100 and the client apparatuses 200.

Figure 5:
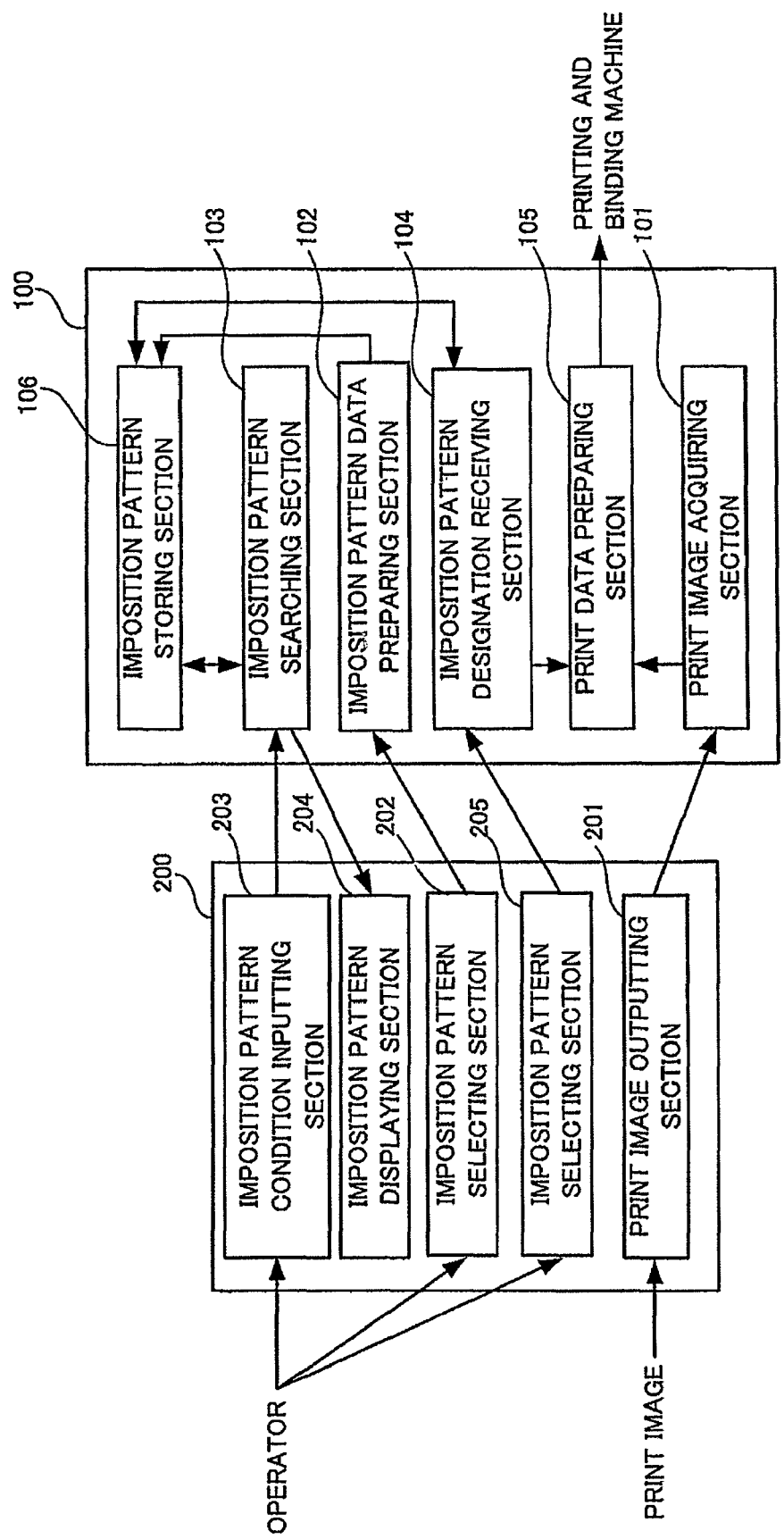
FIG. 5 is a functional block diagram illustrating the print management system in FIG. 1.

FIG. 5 is a functional block diagram illustrating the print management system illustrated in FIG. 1.

The functional block diagram illustrated in FIG. 5 illustrates the functions of the server and client system when the server program 410 illustrated in FIG. 3 is installed in the computer forming the server apparatus 100 in FIG. 1 and the client program 420 illustrated in FIG. 4 is installed in the computer forming the client apparatus 200 in FIG. 1 so that the server and client system operates as one embodiment of the print management system according to the present invention.

The server apparatus 100 has an imposition pattern storing section 106, an imposition pattern searching section 103, an imposition pattern data preparing section 102, an imposition pattern designation receiving section 104, a printing and binding data preparing section 105 and a print image acquiring section 101, and the imposition pattern storing section 106 is mainly implemented by the hard disk apparatus 115 illustrated in FIG. 2 as hardware while the imposition pattern data preparing section 102, the imposition pattern searching section 103, the imposition pattern designation receiving section 104, the print image acquiring section 101 and the printing and binding data preparing section 105 are mainly implemented by the CPU 113 illustrated in FIG. 2 as hardware.

The client apparatuses 200 have an imposition pattern condition inputting section 203, an imposition pattern displaying section 204, an imposition pattern designating section 202, an imposition pattern selecting section 205 and a print image outputting section 201. The imposition pattern designating section 202 and the print image outputting section 201 are mainly implemented by the CPU 113 forming the client apparatus 200 as hardware. The imposition pattern displaying section 204 is mainly implemented by the print image displaying apparatus 120 illustrated in FIG. 2, while the imposition pattern condition inputting section 203 and the imposition pattern selecting section 205 are mainly implemented by the keyboard 130 and the mouse 140. Here, the imposition pattern condition inputting section 203, the imposition pattern designating section 202 and the imposition pattern selecting section 205 respectively correspond to examples of the page number designating section, the free arrangement designating section and the selection arrangement designating section according to the present invention.

In the following, the functions of the respective elements in the print management system 10 illustrated in FIG. 5 will be described together with the flow of operation in this print management system 10 illustrated in FIG. 6. In addition, the respective elements in FIG. 5 are cited in the following using the symbols in FIG. 5 without particularly designating the figure, and FIGS. 7, 8 and 9 will also be described as required.

In this print management system 10, the imposition pattern storing section 106 in the server apparatus 100 stores a standard imposition pattern preset as the standard in the print industry and an imposition pattern of the local standard independently prepared by the user in this print management system 10.

In this print management system 10, an imposition pattern of this local standard is prepared by modifying an imposition pattern selected from among the imposition patterns already stored in the imposition pattern storing section 106 as a base or by preparing an imposition pattern that can be read by the printing and binding machine 500 from the beginning. In the case where a new imposition pattern of the local standard is prepared by modifying an imposition pattern which is already stored, for example, the user inputs conditions, such as the number of pages, to narrow down the candidates of the imposition pattern that becomes the base through the imposition pattern condition inputting section 203, and the imposition pattern that is searched for by the imposition pattern searching section 103 in accordance with the inputted conditions and matches the conditions is displayed on the imposition pattern displaying section 204. The order (numbers) of pages, the relative sizes of the pages, the orientation of the pages and the distance between the pages are represented in the imposition pattern that matches the conditions and is displayed on the imposition pattern displaying section 204, not illustrated, and the user alters the order of the pages, the relative sizes of the pages, the orientation of the pages and the distance between the pages through the imposition pattern designating section 202. The new imposition pattern thus prepared is registered in the imposition pattern storing section 106 by the imposition pattern data preparing section 102 as an imposition pattern of the local standard.

Figure 6:
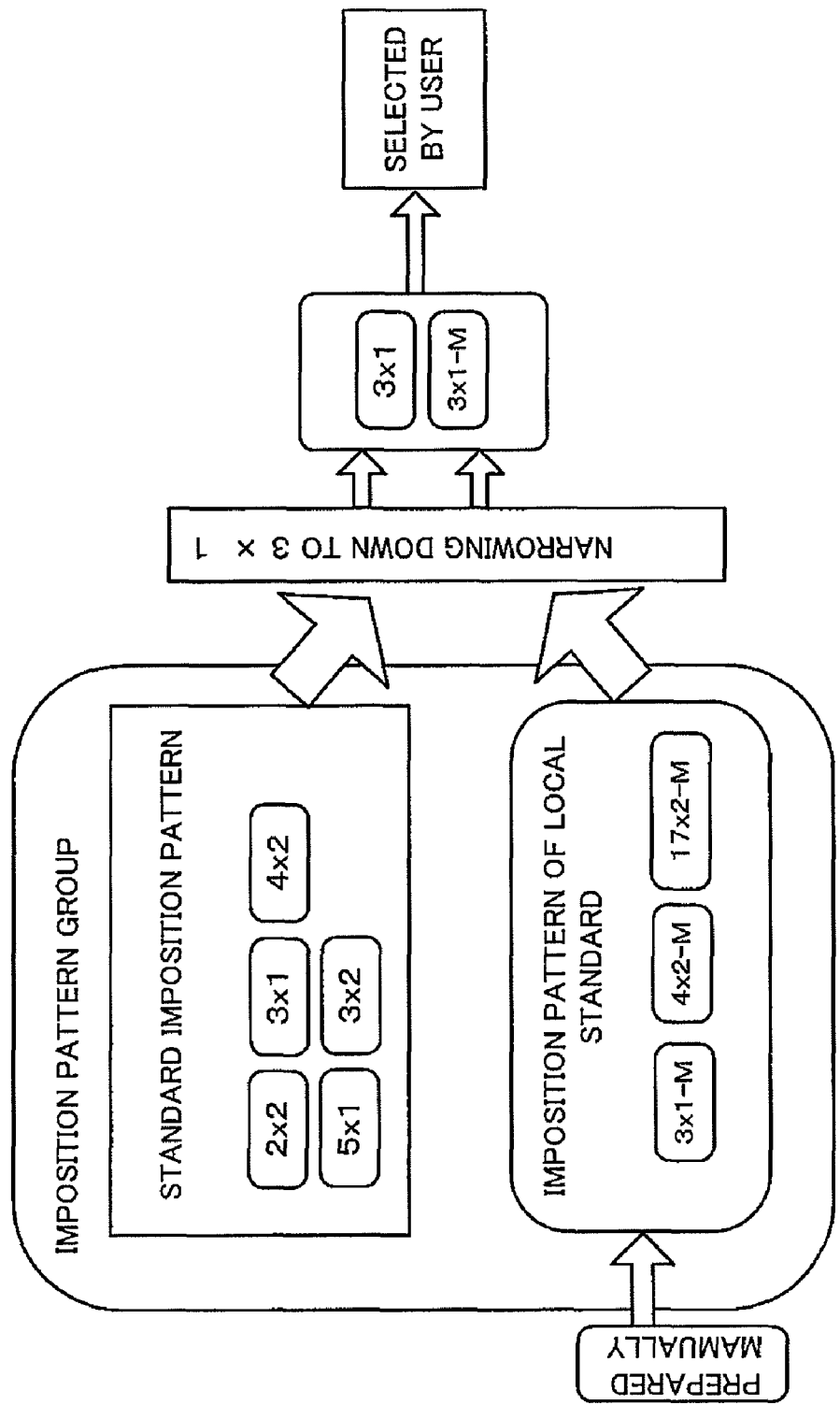
FIG. 6 is a diagram illustrating the flow of the operation in the print management system.

FIG. 6 is a diagram illustrating the flow of the operation in this print management system.

The left side of FIG. 6 illustrates the state where this print management system 10 has the imposition pattern of the local standard prepared in the above as a portion of an imposition pattern group in addition to the standard imposition pattern. The numbers representing the imposition patterns illustrated in FIG. 6 indicate the number of pages arranged in the horizontal direction on one side and the number of pages arranged in the vertical direction in the case where the imposition pattern is a plane having an X axis (horizontal direction) and a Y axis (vertical direction) on a predetermined print paper used in the printing and binding machine 500, and '3×2' means the number of pages arranged in the horizontal direction on one side in the imposition pattern is '3' and the number of pages arranged in the vertical direction is '2,' for example. In addition, 'M' attached to the imposition pattern indicates that the imposition pattern is a local standard.

The center of FIG. 6 illustrates the aspect where the user inputs the number of pages arranged in the horizontal direction on one side as '3' and the number of pages arranged in the vertical direction as '1' under the conditions for the imposition pattern for printing and binding through the imposition pattern condition inputting section 203, and thus '3×1' and '3×1–M' gained by narrowing down the imposition patterns registered in the imposition pattern storing section 106 by the imposition pattern searching section 103 are displayed on the imposition state displaying section 204. That is to say, in this print management system 10, the imposition patterns, which are already registered in the imposition pattern storing section 106, are narrowed down to those having an arrangement for aligning the same number of pages as the designated number when the number of pages aligned on the print paper is designated.

Figure 7:
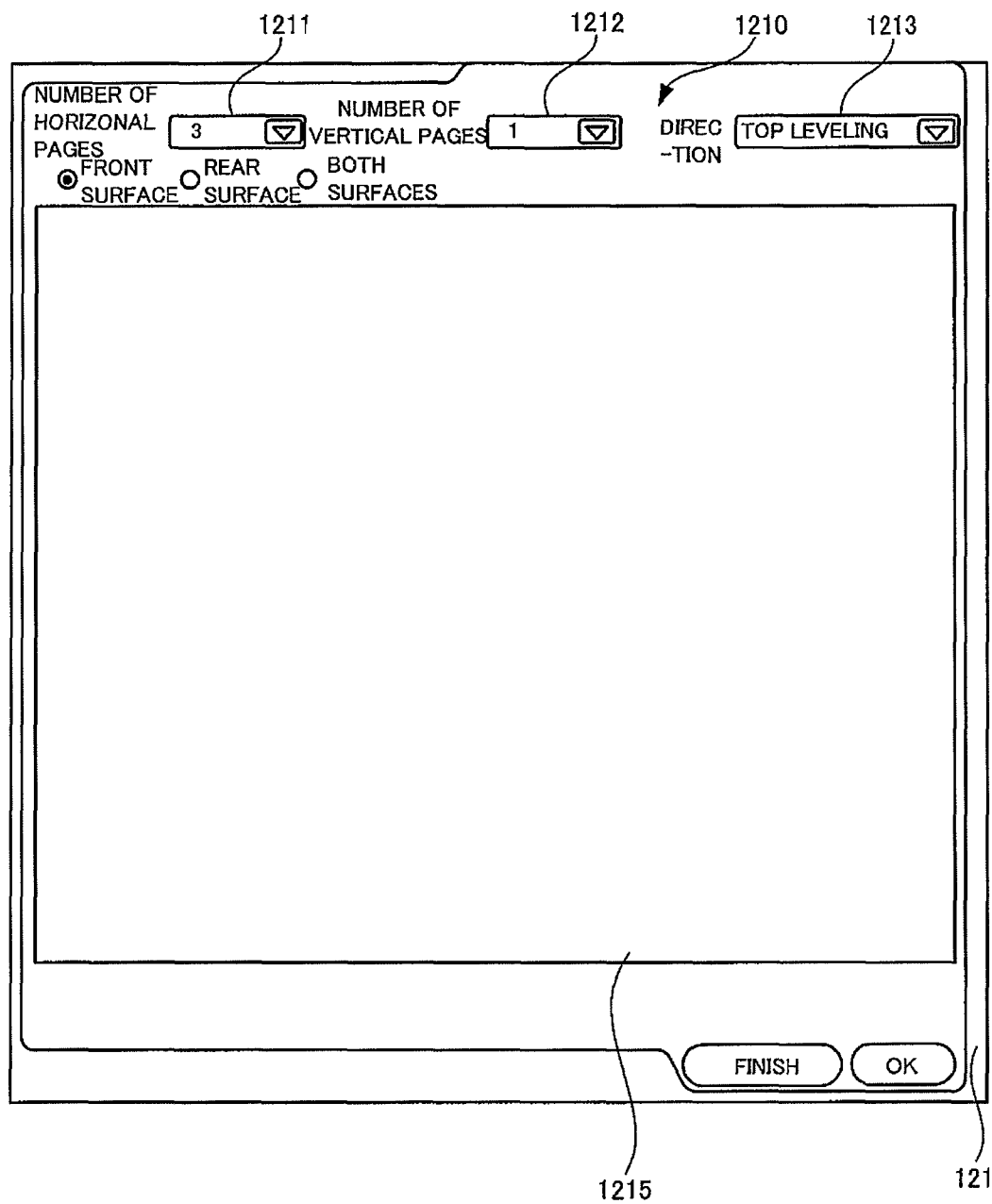
FIG. 7 is a diagram illustrating the state when an imposition pattern is selected.

FIG. 7 is a diagram illustrating the state when an imposition pattern is selected.

FIG. 7 illustrates a display screen 121 of the print image display device 120 illustrated in FIG. 1 and the like, and an image for selecting an imposition pattern 1210 to be used when an imposition pattern is selected is displayed on this display screen. An area for the number of horizontal pages 1211, an area for the number of vertical pages 1212 and an area for direction 1213 are provided at the upper end of the image for selecting an imposition pattern 1210 as areas in which conditions are inputted when an imposition pattern desired by the user from among a number of imposition patterns is narrowed down. In the area for the number of horizontal pages 1211, the number of pages to be arranged in the horizontal direction per side of a predetermined print paper used in the printing and binding machine 500 can be inputted, and in the area for the number of vertical pages 1212, the number of pages arranged in the vertical direction can be inputted. Furthermore, though not illustrated in FIG. 6, in the print management system 10, either 'top leveling,' where print images of the two pages arranged in the horizontal direction on the first page in the vertical direction and a print image of the two pages arranged in the horizontal direction on the second page in the vertical direction are leveled in such an aspect that the print images are level at the top, or 'bottom leveling,' where print images are leveled at the bottom, is inputted in the area for direction 1213 in the case where imposition of pages where the number of horizontal pages is '2' and the number of vertical pages is '2' is carried out on print paper, for example, and thus, the designated imposition pattern in terms of the described 'direction of pages' can be selected.

Meanwhile, an icon 'OK' to be operated by the user when an imposition pattern searching section 103 meets the input conditions and an icon 'finish' to be operated when an image for selecting the imposition pattern 1210 is finished are illustrated at the lower end of the image for selecting the imposition pattern 1210.

In addition, a display area 1215 for displaying the pattern name and aspect of the imposition pattern narrowed down by the input conditions is provided in the center portion of the image for selecting the pattern 1210. 'Front surface,' 'rear surface' and 'both surfaces' illustrated at the bottom of the area for the number of horizontal pages 1211 will be described below.

Figure 8:
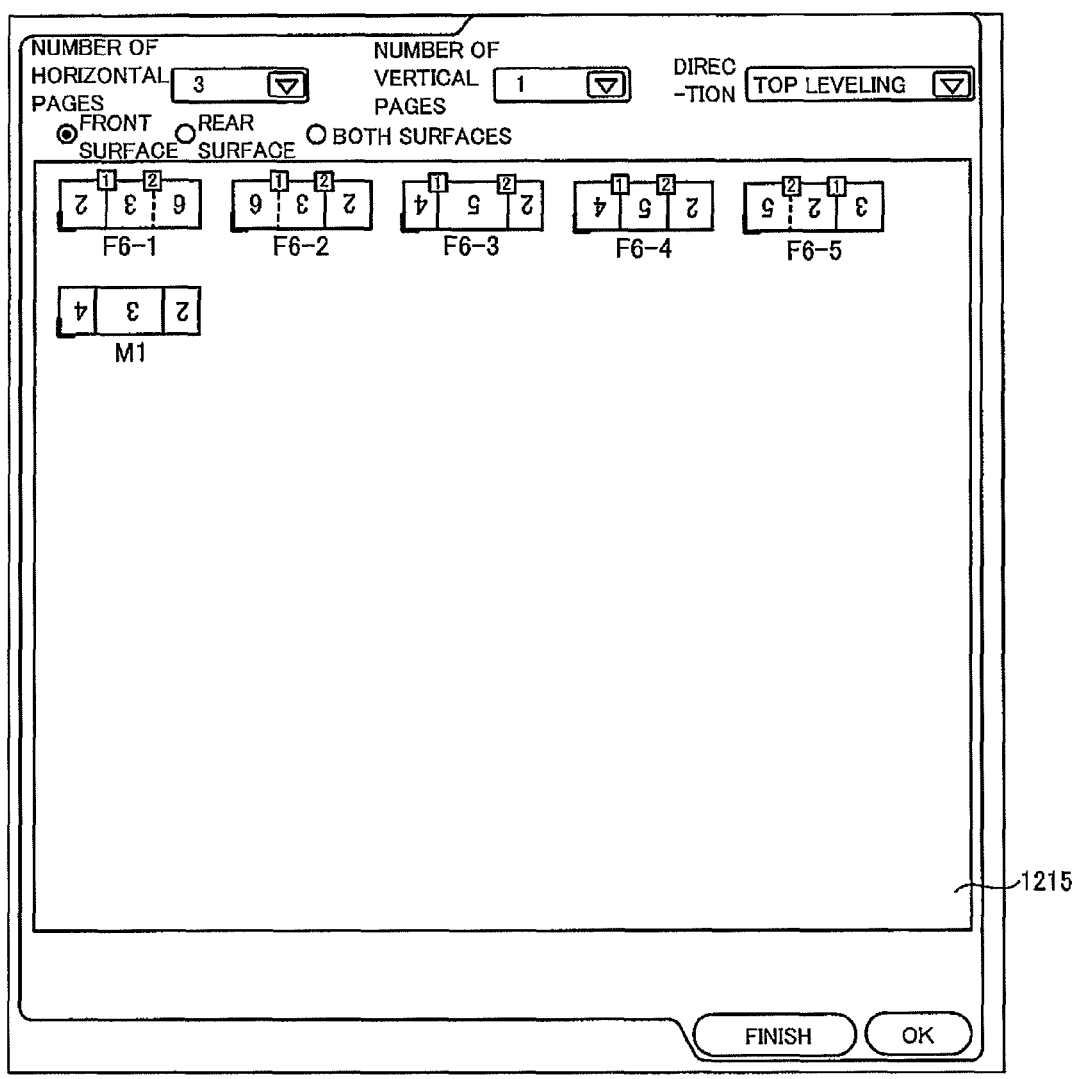
FIG. 8 is a diagram illustrating a state where an imposition pattern corresponding to the conditions for searching inputted by the user is displayed.

FIG. 8 is a diagram illustrating a state where an imposition pattern corresponding to the search conditions inputted by the user is illustrated.

FIG. 8 illustrates an image for selecting an imposition pattern 1210 displayed on the display screen 121 in the case where the icon 'OK' is operated after the number of horizontal pages '3' and the number of vertical pages '1' are inputted as conditions for searching, and the display area 1215 on the image for selecting an imposition pattern 1210 represents an imposition pattern that is narrowed down by the imposition pattern searching section 103. Here, though 'top leveling' is inputted in the area for direction 1213 in FIG. 8, in the case where the number of vertical pages is '1,' input in the area for direction 1213 is meaningless, and the default is simply displayed here.

The display area 1215 represents 'F6-1,' 'F6-2,' 'F6-3,' 'F6-4' and 'F6-5,' which are names for the standard pattern, and 'M1,' which is the name of the local standard pattern, as well as aspects corresponding to the respective pattern names. Concerning 'F6-1,' for example, three pages each for front and rear surfaces, that is, six pages in total, are arranged, and the front surface represents a state where the page '2,' the page '3' and the page '6' are arranged from the left. The aspect of the arrangement of the pages is represented in this aspect because 'front surface' from among 'front surface,' 'rear surface' and 'both surfaces' illustrated at the bottom of the area for the number of horizontal pages 1211 is selected when the search conditions are inputted at the time. In the case where 'rear surface' is selected, an aspect where the pages '1,' '4' and '5' are arranged from the left is illustrated, and in the case where 'both surfaces' is selected, an aspect where the pages are allocated to the front and rear surfaces at the same time is displayed. In addition, the aspects corresponding to the standard imposition patterns 'F6-1' to 'F6-5' represent the folding point, the folding order and the type of fold. As for 'F6-1,' an imposition pattern where the paper is folded in 'valley fold,' as represented by a solid line, between page '2' and '3,' and next, the page is folded in 'mountain fold,' as represented by the dotted line, between page '3' and '6' is illustrated. Here, 'F6-1,' 'F6-2,' 'F6-4' and 'F6-5,' from among the standard imposition patterns, are standard patterns for binding, where the paper is folded in the displayed folding aspect, and after that the ends are cut following the cutting aspect corresponding to the imposition pattern, and 'F6-3' is a standard pattern for pamphlets where the paper is simply folded like an accordion and not cut. In addition, the local standard imposition pattern 'M1' illustrated in the display area 1215 is a local standard pattern for pamphlets where the paper is simply folded like an accordion and not cut.

A pattern is selected from among the imposition patterns displayed as illustrated in FIG. 8 when a user clicks the pattern name for the desired imposition pattern using a mouse 130.

Figure 9:
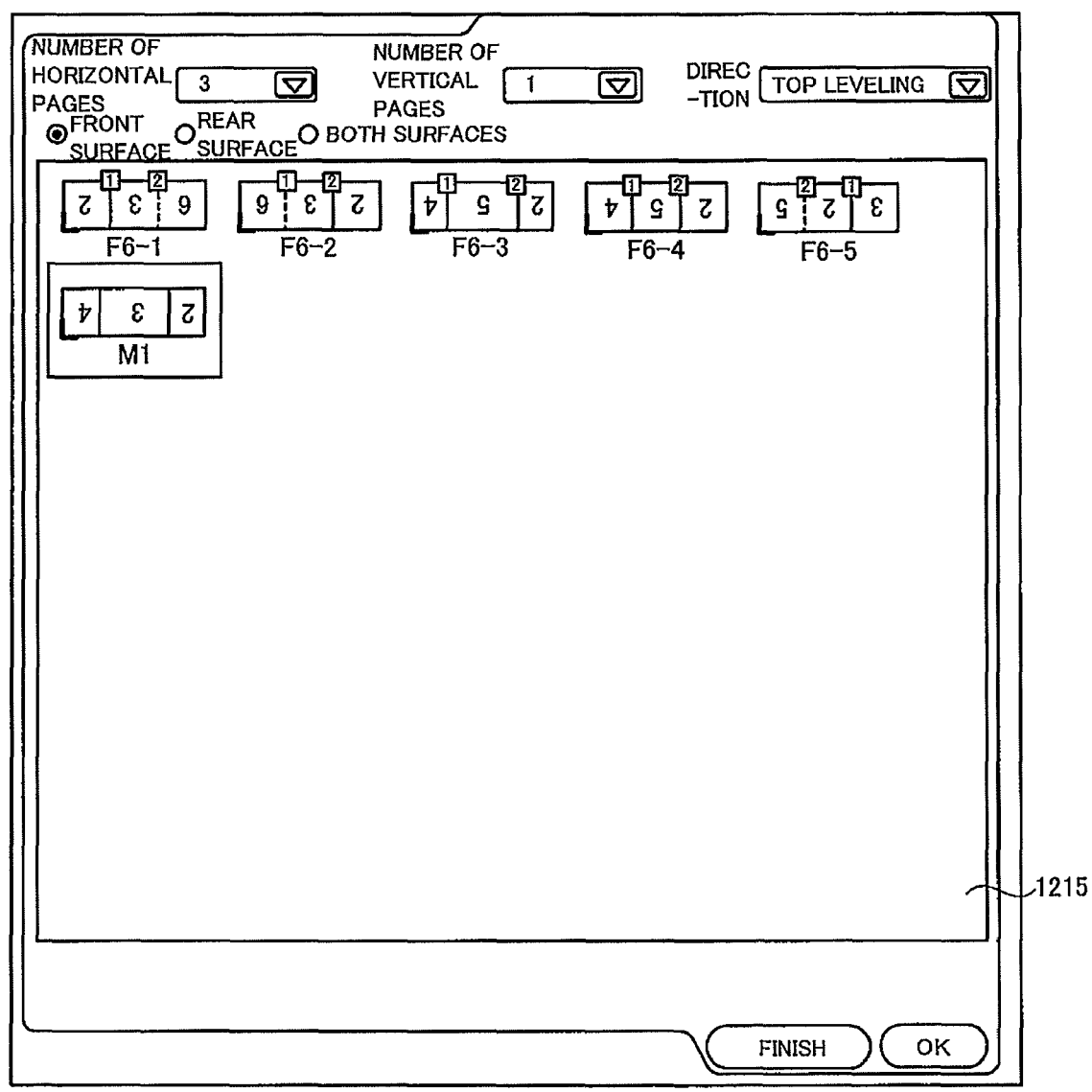

FIG. 9 is a diagram illustrating a state where an imposition pattern is selected from among the displayed imposition patterns that have been searched for.

FIG. 9 illustrates a state where the local standard pattern M1 is selected by the user from among the imposition patterns displayed in the display area 1215.

As illustrated in FIG. 9, when a user selects an imposition pattern, the selected imposition pattern is recognized by the imposition pattern designation receiving section 104 through the imposition pattern selecting section 205. After that, the page data representing print images that are read when the user uses a color scanner 400, to which the selected imposition pattern is applied is acquired by the print image acquiring section 101 through the print image outputting section 201, and then, print data made up of page data for representing print images acquired by the print image acquiring section 101, arrangement data for representing the arrangement of these print images in accordance with the imposition pattern recognized by the imposition pattern designation receiving section 104, folding aspect data, and cutting aspect data is prepared in the print data preparing section 105. This print data is sent from the print data preparing section 105 to the printing and binding machine 500, and the printing and binding machine 500 prints page data arranged on print paper in accordance with the content of the arrangement data, and the print paper is folded on the basis of the folding aspect data and then cut on the basis of the cutting aspect data.

As described above, in the print management system 10 according to the present embodiment, an imposition pattern outside the standard prepared in an external imposition system in conventional print management systems can be prepared in the present system, and an imposition pattern can be narrowed down strictly following the conditions for searching inputted by the user from among current imposition patterns. Accordingly, the print management system 10 according to the present embodiment can easily impose pages on print paper.

In addition, the print management system 10 according to the present embodiment makes it possible to change the order of pages, the relative size of pages, the orientation of the pages, and the folding aspect and the cutting aspect for the imposition patterns that are already registered in the imposition pattern storing section 106, and therefore, it is easy to prepare a new imposition pattern. Accordingly, pages can be easily imposed on print paper in the print management system 10 according to the present embodiment.

Furthermore, the imposition patterns in the print management system 10 according to the present embodiment define the folding aspect and the cutting aspect, in addition to the arrangement of pages on the print paper, and therefore, the folding aspect and the cutting aspect of the print paper on which print images are printed, in addition to the printing of print images in accordance with the imposition pattern on the print paper, can be dealt with as data. Accordingly, the print management system 10 according to the present embodiment makes it possible to automate the preparation up to the binding stage.

Though the print management system 10 is described in the above citing an example where page data representing print images and arrangement data representing the arrangement of print images are sent to the printing and binding machine 500, so that data representing print images corresponding to the entire surface of the print paper can be prepared in the printing and binding machine 500, the printing and binding machine 500 may receive data representing print images corresponding to the entire surface of the print paper.

In addition, though the print management system 10 is described in the above citing an example where the folding aspect and the cutting aspect are also defined as an imposition pattern, it is not necessary for the imposition pattern to define the folding aspect and the cutting aspect, as long as the imposition pattern defines the arrangement where pages are aligned. In addition, though the print management system 10 is described in the above citing an example where the arrangement of pages on print paper is illustrated in the display area 1215, the display area 1215 may display only the name of the pattern.

What is claimed is:

1. A print management system, comprising:
   a print management server which comprises:
   a page acquiring means for acquiring page data to represent respective print images for pages to be aligned and printed on a print medium,
   an arrangement storing section which stores pieces of arrangement data to respectively represent prescribed arrangements preset under a predetermined prescription as arrangements for aligning pages on a print medium, and also stores a piece of arrangement data to represent a free arrangement which is not defined under the prescription and to be added after the prescribed arrangements,
   an arrangement data preparing means for preparing a piece of arrangement data to represent a free arrangement when the free arrangement is designated, and stores the piece of arrangement data in the arrangement storing section,
   an arrangement search means for carrying out a search to find, when a number of pages to be aligned on a print medium is designated, pieces of arrangement data that each represent an arrangement where pages whose quantity is the same as the designated number are aligned, through the pieces of arrangement data stored in the arrangement storing section, irrelevant of whether each of the pieces of arrangement data to be found represents the prescribed arrangement or the free arrangement,
   an arrangement designation receiving means for receiving designation of an arrangement to be used for a printing, among the arrangements represented by the pieces of arrangement data found through the search carried out by the arrangement search means, and
   a print data preparing means for preparing, for a print system that receives input of a piece of print data representing print images to be printed on each page of a print medium and also representing an arrangement of the print images on the print medium and outputs the print images for each page on the print medium in accordance with the arrangement, a piece of print data to be used in the print system, in accordance with the print images represented by the page data acquired by the page acquiring means and the arrangement of the designation received by the arrangement designation receiving means; and
   a client which comprises:
   a page outputting means for outputting page data to the page acquiring means, a free arrangement designating means for accepting a preparation operation for preparing a free arrangement, and designates, for the arrangement data preparing means, the free arrangement prepared in accordance with the preparation operation, a page number designating means for inputting a number of pages through an operation and for designating the number for the arrangement search means, an arrangement displaying means for displaying arrangements represented by the respective pieces of arrangement data found through the search by the arrangement search means, and a selection arrangement designating means for accepting a selection operation to select an arrangement used to perform a printing from among the arrangements displayed by the arrangement displaying means and designates, for the arrangement designation receiving means, the arrangement selected through the selection operation.

2. The print management system according to claim 1, wherein the free arrangement designating means receives a modification operation which modifies an arrangement represented by a piece of arrangement data stored in the arrangement storing section as the preparation operation, and designates, for the arrangement data preparing means, contents of the modification by the modifying operation, and the arrangement data preparing means adopts the modification of which the contents are designated by the free arrangement designating means to establish a free arrangement and prepares a piece of arrangement data to represent the established free arrangement.

3. The print management system according to claim 1, wherein the arrangement displaying means displays an arrangement of pages on a print medium.

4. The print management system according to claim 1, wherein the prescribed arrangement defines how to fold a print medium under the prescription, and the arrangement displaying means displays the arrangement of pages on a print medium and how to fold the print medium.

* * * * *